No. 873,231.
PATENTED DEC. 10, 1907
J. HARTSHORN.
TRAP FISH HOOK.
APPLICATION FILED MAR. 14, 1907.
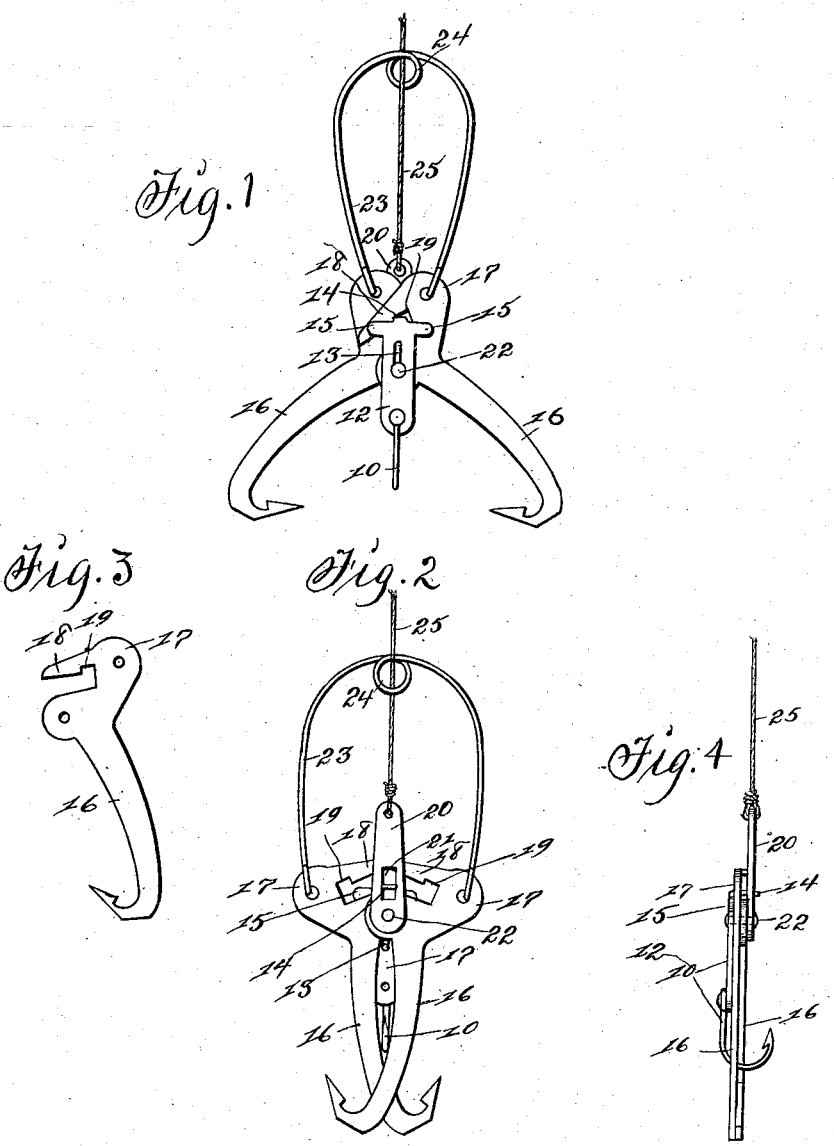

UNITED STATES PATENT OFFICE.

JOSEPH HARTSHORN, OF DES MOINES, IOWA.

TRAP FISH-HOOK.

No. 873,231.  Specification of Letters Patent.  Patented Dec. 10, 1907.

Application filed March 14, 1907. Serial No. 363,107.

*To all whom it may concern:*

Be it known that I, JOSEPH HARTSHORN, a citizen of the United States, residing at Des Moines, in the county of Polk and State of Iowa, have invented a new and useful Trap Fish-Hook, of which the following is a specification.

My object is to provide a simple, strong, durable and efficient trap fish-hook with less elements than heretofore and to dispense with a coil spring for normally retaining parts separated as required to leave bait on the hook accessible to fish.

My invention consists in the construction, arrangement and combination of elements as hereinafter set forth, pointed out in my claims and illustrated in the accompanying drawings in which:

Figure 1 shows the hooks in a separate position as required to admit a fish to seize bait on the main and central hook. Fig. 2 shows the reverse side of Fig. 1 and the hook in a closed or crossed position as required to fasten the main hook in the mouth of a fish and the two auxiliary hooks in the sides of the head of a fish. Fig. 3 is a diagrammatical view of one of the auxiliary hooks. Fig. 4 is a side elevation of Fig. 2 and shows different parts in overlying position.

The numeral 10 designates the main hook upon which bait is to be placed. It is fixed to the lower end of an elongated metal plate 12 that has a slot 13 on its central portion, a projection 14 at its top that is bent inward at right angles and lateral projections 15 as shown in Fig. 1.

Two auxiliary mating hooks 16 have extensions 17 at their tops that terminate in horizontal projections 18 that are provided with notches 19 in their lower edges as clearly shown in Fig. 3. The mating hooks 16 are jointly pivoted to the lower end of a plate 20 as shown in Fig. 2 and the plate is provided with a slot 21 into which the projection 14 at the top of the plate 12 enters as required to allow the projection to traverse the slot 21 in the plate 20 whenever the main hook 10 and the plate 12 are moved relative to the pivot 22 that connects the hook 16 and traverses the slot 13 in said plate.

A wire spring 23 has a coil at its center to produce an eye 24 and the ends of the spring are fixed to the extensions 17 as shown in Figs. 1 and 2. A line 25 is fixed to the top of the plate 20 and extended through the eye 24 to be connected with a fish rod.

In the practical use of my invention when the plate 13 is elevated to its limit relative to the pivot 22 the auxiliary hooks 16 will be placed in position as shown in Fig. 1 and the projection 14 of the plate 12 in the notches 19 of the parts 18 of the hooks 16 will retain the hooks apart as required to allow bait to be placed on the main hook to be accessible to a fish. And when a fish has seized the bait and main hook and pulls the plate 12 downward relative to the hooks 16 and the pivot 22 and thereby pulls the projection 14 out of the notches 19 the spring 23 will normally expand at its lower end and press the hooks 16 towards each other as shown in Fig. 2 and as required to force them into the head of the fish on the main hook to securely retain the fish fast to be drawn out by the line 25.

Having thus set forth the purpose of my invention and its construction and manner of use the practical operation and utility thereof will be obvious.

What I claim as new and desire to secure by Letters-Patent, is:—

1. In a trap fish hook, two mating auxiliary hooks having extensions at their upper ends and lateral projections on the extensions provided with notches in their lower edges pivotally connected with each other, a plate having a slot to be traversed by the pivot fixed in the overlying parts of the auxiliary hooks, a main hook fixed to said plate and a projection at the upper end of the plate to enter the notches in the tops of the auxiliary hooks, to operate as set forth.

2. In a trap fish hook, two mating auxiliary hooks having extensions at their upper ends and lateral projections on the extensions provided with notches in their lower edges pivotally connected with each other, a plate having a slot to be traversed by the pivot fixed in the overlying parts of the auxiliary hooks and a projection at the upper end of the plate to enter the notches in the tops of the auxiliary hooks, a main hook fixed to said plate, and means to normally press the auxiliary hooks towards the main hook, to operate as set forth.

3. In a trap fish hook, two mating auxiliary hooks having extensions at their upper ends and lateral projections on the extensions provided with notches in their lower edges pivotally connected with each other, a plate having a slot to be traversed by the pivot fixed in the overlying parts of the auxiliary hook and a projection at the upper end of the plate to enter the notches in the tops of the auxiliary hooks, a main hook fixed to said plate and a spring connected with the upper ends of the auxiliary hooks, to operate as set forth.

4. In a trap fish hook, two mating auxiliary hooks having extensions at their upper ends and lateral projections on the extensions provided with notches in their lower edges pivotally connected with each other, a plate having a slot to be traversed by the pivot fixed in the overlying parts of the auxiliary hooks and a projection at the upper end of the plate to enter the notches in the tops of the auxiliary hooks, a main hook fixed to said plate and a plate, provided with a slot, fixed to the pivot for connecting a line with the plate having a fixed main hook, to operate as set forth.

5. A trap fish hook comprising a plate having a longitudinal slot and a right angled projection at its top, a main hook fixed to said plate, two auxiliary hooks pivotally connected with each other and the pivot extended through the slot in said plate, extensions at the tops of the auxiliary hooks provided with lateral projections having notches, a second plate having a longitudinal slot fixed to the pivot in the auxiliary hooks, and a spring having an eye at its center and its ends fixed to the auxiliary hooks, arranged and combined to operate as set forth.

JOSEPH HARTSHORN.

Witnesses:
GEORGE ZAUN, Jr.,
THOMAS G. ORWIG.